Oct. 4, 1960

A. HALE ET AL 2,954,580

CONTINUOUS MILL

Filed Jan. 2, 1959

INVENTORS.
ANDREW HALE &
HAROLD G. BAILEY
BY Ely, Frye & Hamilton
ATTORNEYS

INVENTORS.
ANDREW HALE &
HAROLD G. BAILEY
BY
ATTORNEYS

Oct. 4, 1960  A. HALE ET AL  2,954,580
CONTINUOUS MILL

Filed Jan. 2, 1959  4 Sheets-Sheet 3

INVENTORS.
ANDREW HALE &
HAROLD G. BAILEY
BY
ATTORNEYS

Oct. 4, 1960    A. HALE ET AL    2,954,580
CONTINUOUS MILL

Filed Jan. 2, 1959    4 Sheets-Sheet 4

INVENTORS.
ANDREW HALE &
HAROLD G. BAILEY
BY
Ely, Frye & Hamilton
ATTORNEYS

United States Patent Office 2,954,580
Patented Oct. 4, 1960

2,954,580
CONTINUOUS MILL

Andrew Hale and Harold G. Bailey, Akron, Ohio, assignors, by mesne assignments, to Blaw-Knox Company, Pittsburgh, Pa., a corporation of Delaware Filed Jan. 2, 1959, Ser. No. 784,758

5 Claims. (Cl. 18—2)

The present invention relates to continuous mills such as used in the processing of rubber, including natural and synthetic rubbers, reclaimed rubbers or mixtures thereof. The mill is also used for the processing of artificial resins or other synthetic plastic materials which are milled in substantially the same manner as rubber. The invention is adapted to be combined with an ordinary mill.

A continuous mill of which the machine shown herein is an example is a mill in which the stock, whether rubber or other plastic material, is successfully worked during its passage through the mill so that a thoroughly milled stock is delivered by the mill after having passed through a series of milling operations. Mills of this type are well known. In operation, the stock, which may have been previously mixed and plasticized or partially plasticized in a Banbury mixer or plasticizer, may be fed at one end of a pair of mill rolls and is preferably successively subdivided and passed along the mill rolls, being repeatedly passed through the bite of the rolls and thus worked and reworked several times before it reaches the far end of the mill rolls, where the stock is removed.

It is the purpose of the present invention to improve upon previous forms of continuous mills with a view to making them more positive and certain in operation and to lessen the supervision that is required. The present improvements enable the automatic operation of mills at substantially higher than normal speeds. The mill shown herein is designed along the lines of the continuous mill shown in the prior Hale and McClellan Patent No. 2,730,755, dated January 17, 1956.

The mill shown in the aforesaid Patent No. 2,730,755 worked satisfactorily, and particularly on some types of stocks, but it was found that in actual operation it required careful adjustment and considerable supervision, particularly in starting the mill, because the coils of stock would frequently escape from the coiling rolls and thrash about, making it necessary for the mill roll attendant to be on hand to restore the coils to their correct position.

The object of the present invention is to modify the basic construction of the aforesaid patented device so as to correct that tendency of the stock to get out of hand in the running of the mill. It has been discovered that, if the faces of the curling rolls are formed as shallow cones and their axes tilted to bring one side of the cone into close parallelism with the work roll, by driving the curling rolls so that their parallel sides move in the opposite direction to the work roll, the sheet of stock will curl upon itself at each curling roll without the aid of any plows or turning blades, and will travel to the V-shaped pockets formed between the opposite sides of the curling rolls and the work roll, where the coils of stock will be retained as they pass on around the work roll back to the bank.

The present invention has greatly improved the operation of continuous mills so that little or no supervision is required, the mills turning out thoroughly processed rubber or plastic stocks with only limited attention on the part of the operator.

In the accompanying drawing there is shown one embodiment of the invention, it being understood that this is exemplary only and that the invention may be incorporated in other forms. For example, the invention is shown applied to an ordinary two-roll horizontal mill, but it may, with slight modification, be equally well adapted to vertical two-roll mills or to three-roll mills. It is particularly adapted to be applied to a sheeting mill receiving batch material from an internal mixer, completing the mixing operation, and automatically delivering the stock from the mill.

In the drawings, in which the best known and preferred form of the invention is shown:

The mill, except for the addition of the parts which make it a continuous mill, may be of any usual or standard design. It consists of end frames 1 and 2, the left hand frame as viewed in Fig. 1 being at the intake end of the mill and the right hand frame 2 being at the output end of the mill. Across the top of each frame is the cap member 3.

Figure 2:
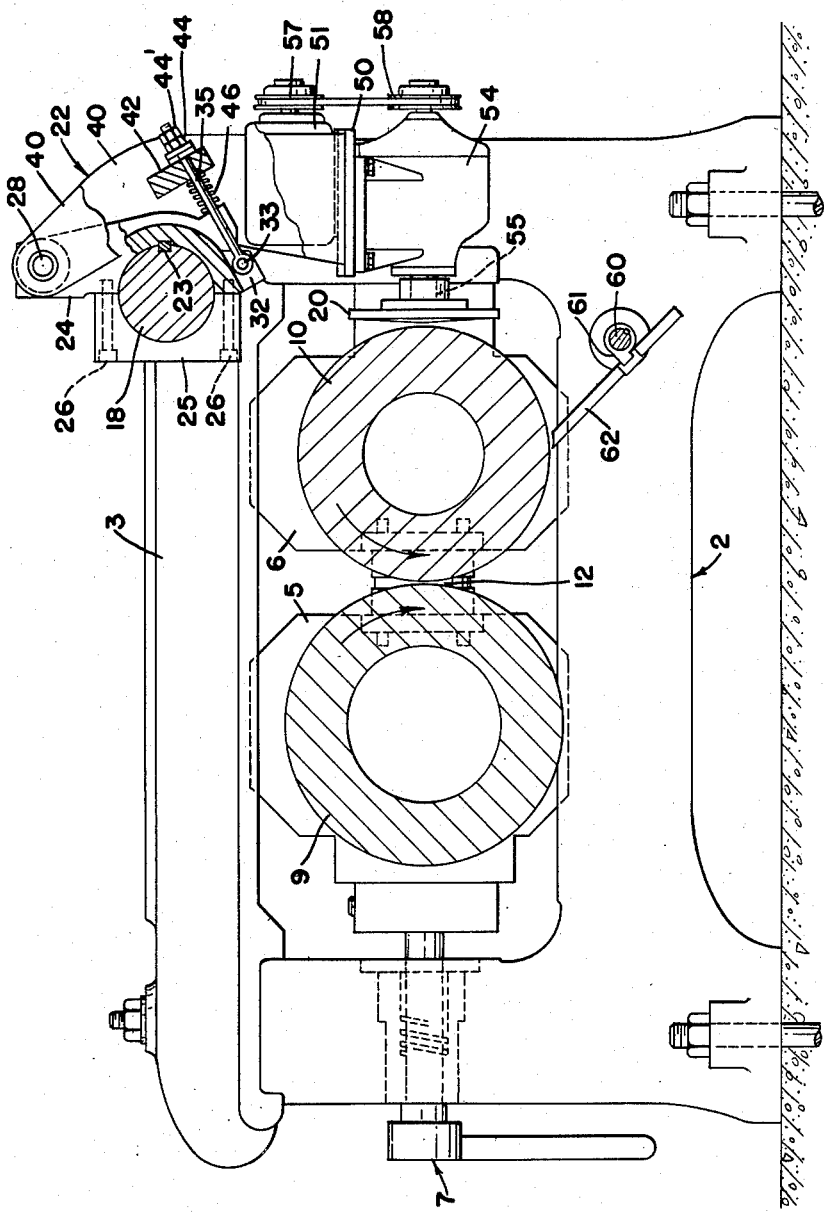
Fig. 2 is a cross section through the mill on the line 2—2 of Fig. 1.

Located in the frames are the two bearing members 5 and 6 which are adjustable relative to each other to vary the thickness of the sheet formed by the mill by any standard form of adjusting device indicated by the numeral 7. Located in the bearings are the usual feed roll 9 and work roll 10 which are driven in the usual manner and which form the bite 12. The rolls are cored out for the circulation of a cooling or heating medium as may be required in accordance with usual milling practices. The direction in which the rolls are revolved is shown in Fig. 2, the work roll carrying the sheet of stock S as it issues from the bite of the rolls. The means for feeding the unmilled stock is not shown, as any suitable feed mechanism may be used.

The bank of stock which accumulates at the bite 12 is indicated at B. The amount of stock which is maintained in the bank is determined by the rate at which the milled stock is removed, it being desirable always to have an excess of stock in the mill so that it will be thoroughly worked and reworked in its passage through the mill and so as to insure a uniform output for the mill.

The temperature of the rolls 9 and 10 may vary with particular stocks, as has been fully described in Patent No. 2,730,755, to which reference may be had for other details of mill operation.

On either side of the mill and on the top of the mill adjacent the work roll are the two brackets 15, in the depending portions of which is fixed the heavy transverse shaft 18 which extends across the mill above and to the side of the work roll. This shaft serves as the support for the several curling rolls and the take-off mechanism.

Figure 1:
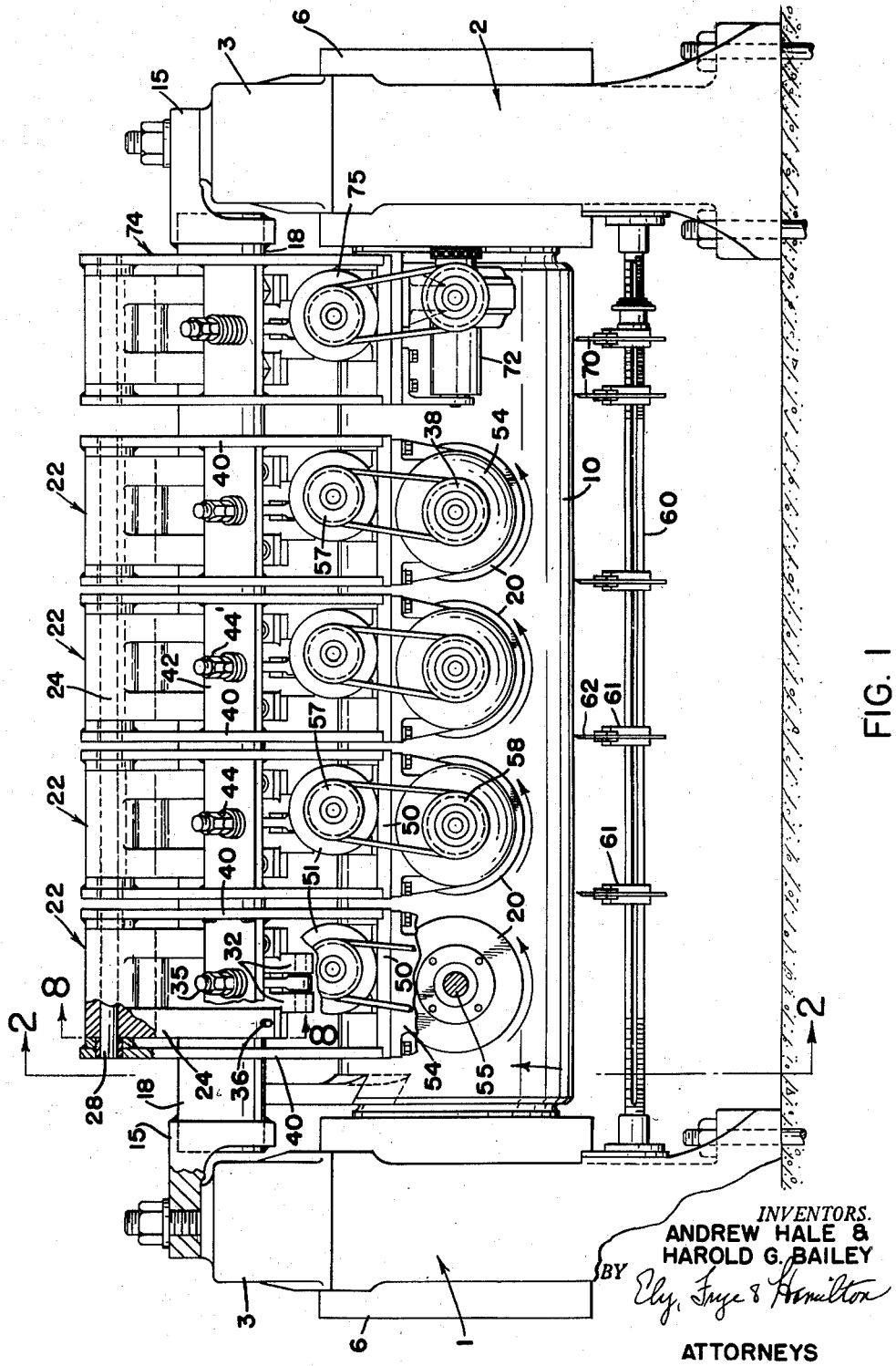
Fig. 1 is a front elevation of a standard two-roll variable speed horizontal mill which is equipped with the curling rolls of the present invention.

In the form of the invention shown herein there are four curling rolls which are given the numeral 20 and which are arranged across the work roll as shown in Fig. 1. The number and size of the curling rolls may vary depending upon the size of the mill and the extent to which the stock should be processed.

Each curling roll is mounted in its individual framework. All of the units which are comprised of the framework, the curling roll and the drive mechanism for the curling roll are the same.

Each curling roll unit consists of a framework which is indicated in general by the numeral 22. Each consists of a bracket 24, the lower portion of which fits against the shaft 18, to which it is keyed as at 23. The bracket is held on the shaft by a cap plate 25 and bolts 26. One side of the bracket 24 extends upwardly above the shaft 18, where it is fitted around a bearing shaft 28 which extends through the bracket to form the bearing for the other section of the framework.

On the lower side of the bracket are located two bearing lugs 32, across which is a shear pin 33 which is received within the eye of a stay bolt 35 which holds the two sections of the framework together, as will be described. The pin 33 is a safety measure so as to allow the entire framework to free itself in case any obstruction is interposed between the curling rolls and the work roll. The lower part of the bracket also serves as a mounting for spring retaining pins 36.

The other section of a curling roll framework 22 is formed by two parallel arms 40 which are located at either side of the bracket 24 and are mounted at their upper ends on the projecting ends of the shaft 28. A cross plate 42, located midway of the arms, serves to tie the arms together.

The stay bolt 35 is slidingly extended through the cross plate 42 and is fitted at its outer end with an adjusting nut 44 which determines the extent to which the curling roll may be spaced from the work roll. A lock nut 44' is mounted on the bolt 35 to lock the nut 44 in adjusted position. The pins 36 are located on either side of the stay bolt and around each pin is a heavy coil spring 46 which, acting between the bracket and the cross plate, yieldingly forces the arms 40 outwardly. A spring guiding and retaining sleeve 48 is located around each pin and within the spring.

Across the lower ends of each pair of arms 40 is a plate 50 which supports the motor 51 which drives the curling roll, and to the underside of the plate 50 is bolted the housing 54 for the transmission unit which drives the shaft 55 which carries the curling roll 20. Variable pitch pulleys which are indicated by the numerals 57 and 58 connect the motor to the curling roll drive so that the tension of the drive belt may be adjusted, and the speed of the curling roll may be adjusted to the speed of the work roll.

As clearly shown in the several views, the working face of each curling roll, i.e., the face adjacent to the work roll, is formed as a shallow cone. The angular degree to which the cone is formed is not invariable and may be changed if found desirable, but it should preferably be quite shallow and in actual practice an angularity of 3° has been found to work in a highly satisfactory manner.

It will also be noted that the shaft 55 of each curling roll is tilted toward the intake or feed end of the mill at the same or approximately the same angle as the cone angle so that the side of the curling roll termed the near side, which is toward the intake end of the mill, is parallel to or approximately parallel to the face of the work roll. The tilting of the axis of the curling roll generates a V-shaped or flaring pocket 58 which is on the far side of the roll 20 or the side toward the output end of the work roll. It is in this pocket 58 that the coil of stock will find its position during the operation of the mill.

The relative speed of rotation of the curling roll to the work roll is regulated so that at the point where the coil of stock locates itself the surface speed of the curling roll is about the same or a little faster than the surface speed of the work roll.

Across the end frames 1 and 2 is located a long shaft 60 to which are keyed a plurality of blade holders 61 which carry slitting knives 62 which extend upwardly and bear against the stock on the work roll to slit it preparatory to the curling operation. The several slitting knives are adjustable along the shaft.

Figure 3:
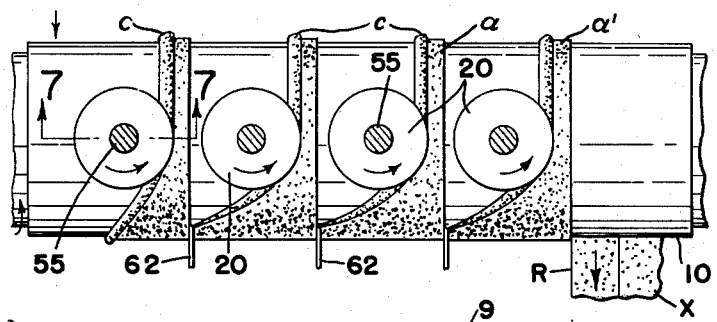
Fig. 3 is a view of the work roll detached from the mill showing the manner in which the stock curls upon itself and finds permanent locations between the curling rolls and the mill roll.
Figure 4:
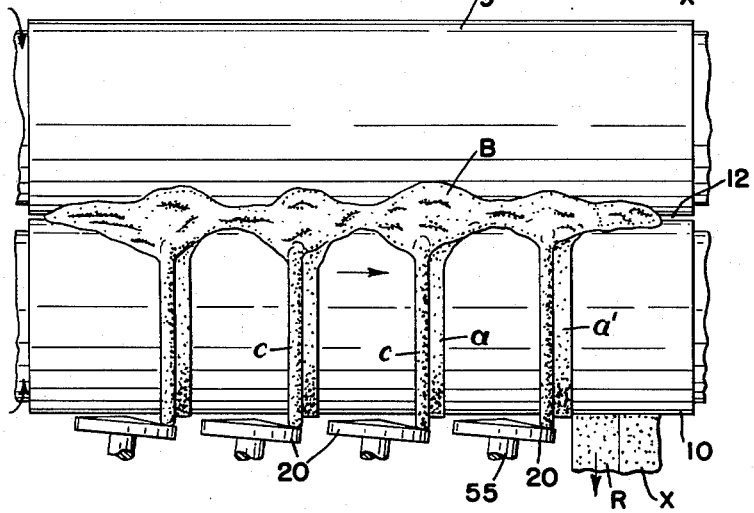
Fig. 4 is a plan view showing the curling rolls in edge view. The view shows the manner in which the several coils of stock find their way back into the bank at the bite between the mill rolls.
Figure 5:
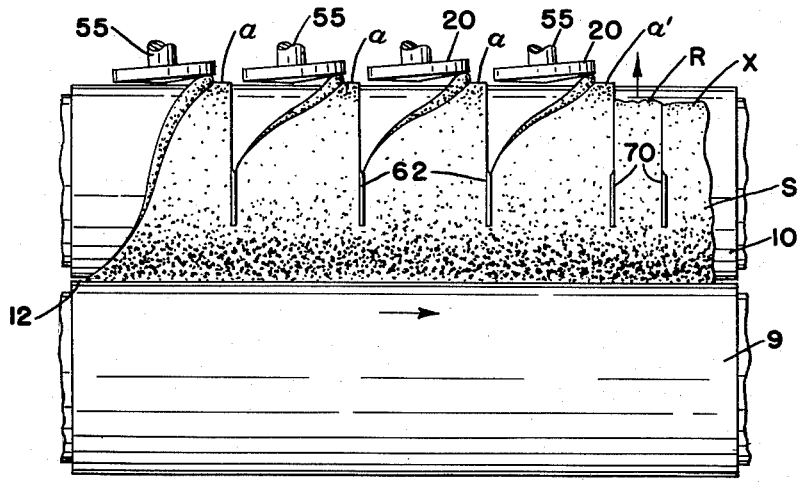
Fig. 5 is a view of the mill rolls looking from beneath.

The slitting knives 62 are preferably each located between a pair of curling rolls, behind one curling roll and in advance of the next, as shown in Figs. 3, 4 and 5, so as to leave a margin of uncoiled stock, indicated at $a$, behind each coil of stock on the work roll.

The manner in which the curling rolls operate is as follows:

As the unprocessed stock is fed to the intake end of the mill it forms the bank B, which extends across the mill. As the stock emerges from the bite 12 it forms a sheet of stock S about the work roll. As the several knives 62 sever the stock, the leading edges of the severed strips are picked up by the parallel sides of the several curling rolls. Each curling roll acts to roll the edge of the stock upon itself from the near side of the roll.

As soon as one or two convolutions of stock have been formed, the partially formed coil of stock will progress across the face of the curling roll and locate itself in the pocket 58, where the final coil $c$ will stay during the entire remainder of the mill operation. As each coil of stock is carried around on the work roll after leaving the curling roll, it is returned and introduced endwise into the bank B, which it joins, to be subsequently remilled.

The behavior of the stock in the manner described is due to the fact that the near side of each curling roll, i.e., that portion which is parallel to or substantially parallel to the surface of the work roll, is positioned close enough to the work roll to contact and pick up the stock, and is being driven in the opposite direction to that of the work roll. This is shown by the arrows on the several views. The oppositely moving surfaces of the work roll and the curling roll cause the edge of the stock to curl, and then deliver the partially curled up edge of the stock to the pocket on the far side of the curling roll. In the manner described, it has been possible to dispense with plows or turning blades, the work which was done by those instrumentalities now being performed by the curling rolls themselves. The surfaces of the work roll and the curling roll which form the sides of the pocket 58 on the far side of the curling roll are running in the same direction.

Another advantage accruing from the changes over the mechanism shown in the Hale and McClellan patent aforesaid is that the coils of stock are apparently firmly anchored in place in the pockets 58 so that they do not whip about and upset the smooth operation of the mill. This is believed to be due to the fact that the fully coiled stock is held in the pockets 58 by the divergent faces of the curling rolls and the work roll, and by the adherence of the marginal uncoiled portions $a$ of the stock to the work roll.

It remains to be noted that the spacing between the near face of each curling roll and the face of the work roll should be substantially less than the thickness of the stock on the work roll, which latter is determined by the spacing at the bite. For example, if the thickness of the stock on the work roll is one-eighth of an inch, the distance between the near side of the curling roll and the work roll should be about .060". These figures may vary depending upon the character of the stock and are not to be taken as limiting, it being necessary merely to be assured that the curling roll does not rub against the work roll and that there is sufficient pressure exerted on the stock to cause it to form into the initial coil. The curling operation is started at each roll and proceeds automatically in the manner described and without attention on the part of the operator.

After leaving the last curling roll the stock passes to the take-off end of the mill where are located two slitting knives 70 which cut a ribbon of stock R which is removed from the mill in the manner to be described, the first knife 70 being positioned to leave a margin a' of uncoiled stock similar to the margins a left by knives 62. The knives 70 are adjustably mounted on the shaft 60 and are set to cut the desired amount of stock from the sheet S. At the far end of the work roll there will be a strip of stock X which is either allowed to return to the bank B or is returned to the feed end of the mill or to the means for preparing the unmilled stock.

Figure 6:
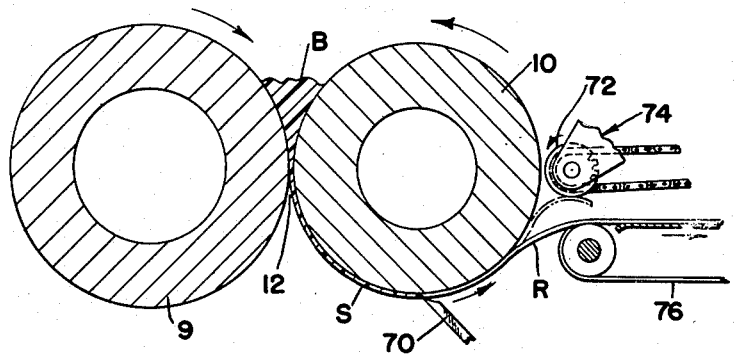
Fig. 6 is a section through the mill rolls at the take-off end of the mill.
Figure 7:
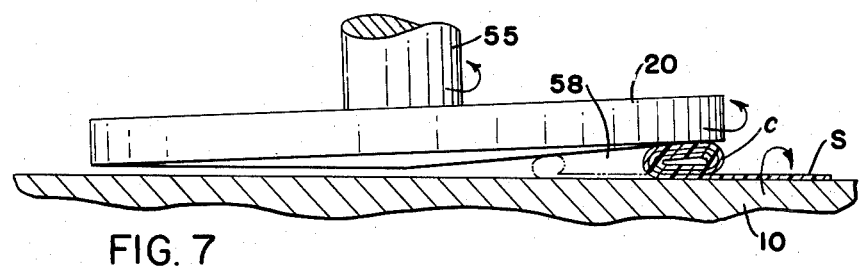
Fig. 7 is an enlarged view of a single curling roll showing the manner in which the curled up stock is located beneath the curling roll. This is taken on the line 7—7 of Fig. 3.

The ribbon R is removed from the mill by a take-off roller 72 which is supported on the lower end of a framework 74 similar to the frameworks 22. This take-off roll is the subject of a copending application of Andrew Hale and Charles L. Conley, Jr., Serial No. 784,716, filed January 2, 1959, to which reference may be made. It need not, therefore, be described in detail here, it being sufficient to say that the roll 72 is positioned close to the work roll and is driven in the opposite direction to the work roll by a motor 75 carried on the framework 74. The roller 72 removes the stock between the slits formed by the blades 70 and delivers it to an off bearing belt 76 in the manner shown in Fig. 6.

Figure 9:
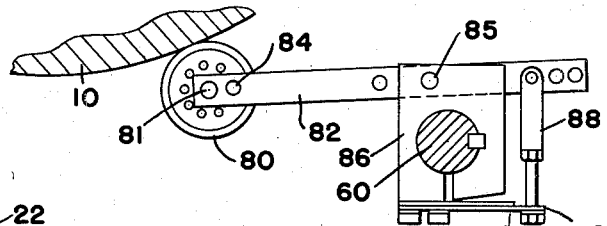
Fig. 9 is a side view of a modified form of cut-off knife.
Figure 8:
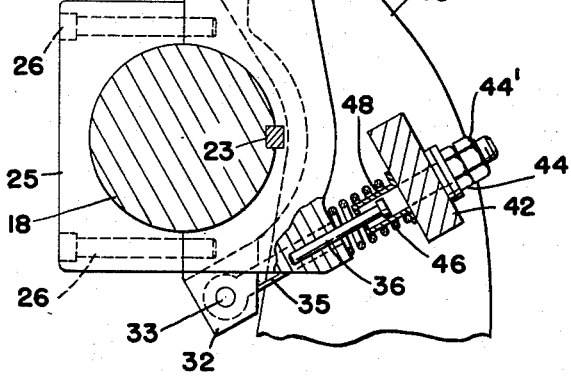
Fig. 8 is a detail of the curling roll support on line 8—8 of Fig. 1.
Figure 10:
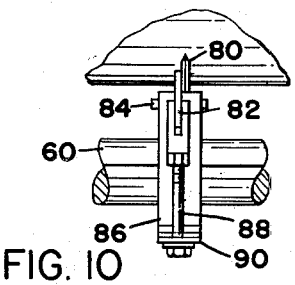
Fig. 10 is a front elevation of the parts shown in Fig. 9.

There is also shown herein a modification of the slitting knives 62 or 70 which may be substituted therefor as a form of slitting knife which is preferred by some manufacturers. This modified form of knife is shown in Figs. 9 and 10.

Each of the modified knives consists of a sharp edged disk 80 which is rotatably mounted on a shaft 81 on the outer end of a lever 82. The disk 80 may be rotated to bring a new cutting surface to bear on the work roll and is held in adjusted position by a pin 84 which is passed through one of a series of holes in the side of the disk. The lever 82 is pivoted at 85 in the top of a bracket 86 which is slidably and adjustably mounted on the shaft 60 but keyed thereto as shown.

The free end of the lever 82 is connected by link 88 to a leaf spring 90 which is fastened on the lower end of bracket 86 and exerts yeilding pressure to hold the circular knife 80 in cutting position against the face of the work roll 10.

It will be understood that while the invention has been described in great particularity and in its preferred form, so that it may be made clear to those skilled in the art, the invention is not limited to the details which have been given. While the curling rolls operate in combination with the mill, it will be understood that the curling roll assembly is usually sold as a distinct unit to be attached to an existing mill. Changes and modifications may be made within the scope of the invention. It is possible that the conical face of each curling roll be modified, and wherever the term "conical" is used in the specification and claims it is intended to cover both a true cone and the equivalent thereof. It is also not necessary to have the one side of the curling roll in exact parallelism with the opposed surface of the work roll.

What is claimed is:

1. In an attachment for use in combination with a mill for plastic materials, said mill having a rotating work roll upon which the material is formed as a sheet of stock, said work roll having an intake end and an output end, the improvement comprising, a curling roll as the sole means of curling said material having a conical face opposed to the work roll, the axis of the curling roll being tilted toward the intake end of the work roll to form a flaring pocket between the opposite side of the curling roll and the work roll, the intake side of said curling roll being spaced from the work roll a distance less than the sheet of stock thereon.

2. A continuous mill having a work roll and a feed roll forming a sheet of stock on the wrk roll, said mill having an intake end and an output end, means located at the output end to remove milled stock, a curling roll having a conical working face opposed to the work roll, the axis of the curling roll being tilted toward the intake end of the mill to bring one side of the curling roll into substantial parallelism with the work roll and to form a flaring pocket on the opposite side of the curling roll, means to drive the curling roll so that the parallel surfaces of the work roll and the curling roll are moving in opposite directions, whereby the sheet of stock on the work roll is coiled between the parallel surfaces of the work roll and the curling roll and progresses into the said pocket.

3. A continuous mill in accordance with claim 2 having a plurality of curling rolls along the work roll and slitting knives for the sheet of stock located between the curling rolls.

4. A continuous mill having a work roll and a feed roll forming a sheet of stock on the work roll, a curling roll as the sole means of curling said stock on said work roll having a conical working face opposed to the work roll, the axis of the curling roll being tilted with respect to the surface of the work roll to bring one side of the curling roll into substantial parallelism with the opposed surface of the working roll, but spaced therefrom at a distance less than the thickness of the stock, the opposite side of the curling roll diverging from the surface of the work roll to form a V-shaped pocket into which will pass a coil of stock formed between the said parallel surfaces, and means to drive the curling roll so that the opposed surfaces of the work roll and curling roll at the pocket move in the same direction.

5. A continuous mill in accordance with claim 4 in which there are a plurality of curling rolls along the work roll, and slitting knives bearing upon the portions of the sheet of stock passing between the curling rolls.

References Cited in the file of this patent

UNITED STATES PATENTS 2,730,755    Hale et al. _____ Jan. 17, 1956